(12) United States Patent
Thomas et al.

(10) Patent No.: US 8,350,720 B2
(45) Date of Patent: Jan. 8, 2013

(54) METHOD AND APPARATUS FOR OBJECT RECOGNITION AND WARNING SYSTEM OF A PRIMARY VEHICLE FOR NEARBY VEHICLES

(76) Inventors: Dave Thomas, Wauconda, IL (US); Barry Markman, Las Vegas, NV (US)

( * ) Notice: Subject to any disclaimer, the term of this patent is extended or adjusted under 35 U.S.C. 154(b) by 882 days.

(21) Appl. No.: 12/229,304

(22) Filed: Aug. 20, 2008

(65) Prior Publication Data

US 2009/0066538 A1 Mar. 12, 2009

Related U.S. Application Data

(63) Continuation-in-part of application No. 11/820,847, filed on Jun. 20, 2007, now abandoned.

(60) Provisional application No. 60/815,353, filed on Jun. 21, 2006, provisional application No. 60/966,112, filed on Aug. 24, 2007, provisional application No. 60/995,173, filed on Sep. 24, 2007, provisional application No. 60/999,417, filed on Oct. 17, 2007.

(51) Int. Cl.
*G08G 1/00* (2006.01)
*G08G 1/16* (2006.01)
(52) U.S. Cl. ......... 340/902; 340/901; 340/903; 340/904
(58) Field of Classification Search .......... 340/901–905, 340/435–436, 468–473
See application file for complete search history.

(56) References Cited

U.S. PATENT DOCUMENTS

| | | |
|---|---|---|
| 3,863,244 A | 1/1975 | Lichtblau |
| 3,895,368 A | 7/1975 | Gordon et al. |
| 3,913,219 A | 10/1975 | Lichtblau |
| 3,949,401 A | 4/1976 | Hegeler et al. |
| 3,967,161 A | 6/1976 | Lichtblau |
| 4,023,167 A | 5/1977 | Wahlstrom |
| 4,281,321 A | 7/1981 | Narlow et al. |
| 4,369,557 A | 1/1983 | Vandebult |
| 4,435,843 A | 3/1984 | Eilers et al. |
| 4,450,589 A | 5/1984 | Eilers et al. |
| 4,476,573 A | 10/1984 | Duckeck |
| 4,785,291 A | 11/1988 | Hawthorne |
| 4,794,394 A | 12/1988 | Halstead |
| 4,961,575 A | 10/1990 | Perry |
| 5,115,223 A | 5/1992 | Moody |
| 5,119,072 A | 6/1992 | Hemingway |
| 5,245,314 A | 9/1993 | Kah, Jr. |
| 5,270,706 A | 12/1993 | Smith |
| 5,289,163 A | 2/1994 | Perez et al. |
| 5,307,053 A | 4/1994 | Wills et al. |
| 5,357,259 A | 10/1994 | Nosal |
| 5,559,508 A | 9/1996 | Orr et al. |
| 5,661,470 A | 8/1997 | Karr |
| 5,760,708 A * | 6/1998 | Seith .............................. 340/903 |

(Continued)

*Primary Examiner* — Donnie Crosland
(74) *Attorney, Agent, or Firm* — Weide & Miller, Ltd.

(57) ABSTRACT

A vehicle to vehicle warning system comprises a transmitter associated with a primary vehicle alerting one or more secondary vehicles of its proximity through a receiver. The transmitter may emit a radio frequency signal which activates radio frequency receivers in surrounding vehicles. When in appropriate proximity, the signal is configured to initiate a warning at the secondary vehicle, such as light from a light-emitting device or sound from a sound-generating device. In another form, the primary vehicle includes a passive transmitter and the secondary vehicle includes a multi-frequency resonance tag/circuit having distinct frequencies for detection and discrimination. The passive transmitter creates electromagnetic waves which are generated as it passes by the secondary vehicle housing the multi-frequency resonance tag, setting off the secondary vehicle alarm system.

4 Claims, 1 Drawing Sheet

U.S. PATENT DOCUMENTS

| | | | |
|---|---|---|---|
| 5,959,551 A | 9/1999 | Cardillo | |
| 5,973,601 A | 10/1999 | Campana, Jr. | |
| 6,052,068 A * | 4/2000 | Price et al. | 340/933 |
| 6,157,321 A * | 12/2000 | Ricci | 340/902 |
| 6,160,493 A | 12/2000 | Smith | |
| 6,252,519 B1 | 6/2001 | McKenna | |
| 6,278,360 B1 * | 8/2001 | Yanagi | 340/436 |
| 6,364,315 B1 | 4/2002 | Velke, III | |
| 6,614,362 B2 | 9/2003 | Siegel | |
| 6,707,392 B1 * | 3/2004 | Melton | 340/902 |
| 6,741,168 B2 * | 5/2004 | Webb et al. | 340/436 |
| 6,778,101 B2 | 8/2004 | Turbeville et al. | |
| 7,043,271 B1 | 5/2006 | Seto et al. | |
| 7,813,699 B2 * | 10/2010 | Ho et al. | 455/41.2 |

* cited by examiner

METHOD AND APPARATUS FOR OBJECT RECOGNITION AND WARNING SYSTEM OF A PRIMARY VEHICLE FOR NEARBY VEHICLES

RELATED APPLICATION DATA

This application is a continuation in part of and claims priority to U.S. application Ser. No. 11/820,847, filed Jun. 20, 2007 now abandoned, which claims priority to U.S. Provisional Application Ser. No. 60/815,353, filed Jun. 21, 2006; and claims priority to U.S. Provisional Application Ser. No. 60/966,112, filed Aug. 24, 2007; U.S. Provisional Application Ser. No. 60/995,173, filed Sep. 24, 2007; and U.S. Provisional Application Ser. No. 60/999,417, filed Oct. 17, 2007.

FIELD OF THE INVENTION

The present invention relates to a method and apparatus for providing a vehicle to vehicle warning system. More specifically, the invention is a method and apparatus by which a primary vehicle, such as an ambulance, fire truck, police car, school bus, or train, warns of its proximity to one or more secondary vehicles.

BACKGROUND OF THE INVENTION

In order to provide a warning to others, vehicles such as ambulances, fire trucks and police cars ("primary vehicles") may utilize loud sirens or flashing lights. Those warnings are generally provided for drivers of other vehicles ("secondary vehicles"). Unfortunately, these warning methods are often not effective, not being heard or seen by drivers or passengers of the secondary vehicles. Other warning means may provide warnings via the secondary vehicle radio. However, communications systems that utilize a secondary vehicle's radio are also not particularly effective, since the driver of the vehicle may not have their radio turned on.

Various prior art exists which describes signal generators and use of those signals. However, this prior art does not teach or suggest a warning signal system which is effective for use with vehicles.

U.S. Pat. No. 5,661,470 (Karr) This invention relates to LC responders and particularly to LC responders that are placed within objects such as toys. In operation, an interrogation or base unit sends a pulse and passive responders reply with their unique frequency which is sensed by the base unit triggering a particular response such as turning on a motor etc.

U.S. Pat. No. 4,023,167 (Wahlstrom) teaches a system in which bursts of radio frequency are transmitted to excite and thereby detect the presence of passive resonant circuits. If a circuit is resonant at a particular burst frequency, it is excited, rings and emits a radio frequency signal. Following each transmitted burst, a receiver is turned on to receive energy emitted by the resonant circuit so that if a resonant circuit is excited, its emitted energy is received and the particular resonant circuit can be identified.

U.S. Pat. No. 3,863,244 (Lichtblau) is an electronic security system adapted having improved noise discrimination for use in a controlled area such as a retail store and employing a multi-frequency resonance tag circuit having distinct frequencies for detection and discrimination.

U.S. Pat. No. 3,895,368 (Gordon) describes an apparatus in which a microwave signal generator projects an electromagnetic wave into a space under surveillance to establish a first field. A pulse or frequency modulated low frequency generator is used to apply a voltage to a discontinuous conductor for establishing a second field, electrostatic in nature, throughout the space. Presence in the space of a miniature, passive, electromagnetic wave receptor-reradiator in the form of a semi-conductive diode connected to a dipole antenna causes the reradiation of the low frequency component modulated on the microwave component as a carrier. The front end of a receiver system is tuned to the microwave frequency signal. A coincidence circuit energizes an alarm circuit whenever the detected signal coincides with the original modulation envelope being applied to the low frequency generator.

SUMMARY OF THE INVENTION

The present invention is an inexpensive, simple, and independent warning system for a primary vehicle to alert its proximity to a plurality of secondary vehicles. These secondary vehicles will then be able to yield in a timely fashion to the primary vehicle.

In one embodiment, a primary vehicle is equipped with a transmitter and the secondary vehicles are equipped with receivers, and the secondary vehicles are configured to provide or initiate a warning in the event a signal is detected from a primary vehicle. The transmitter and/or signal may be active, such as a transmitter transmitting a wireless signal, or passive, such as a transmitter/signal which is detectable by the secondary vehicle.

One aspect of the invention is a method and apparatus that comprises a radio transmitter in the primary vehicle and radio receivers in the secondary vehicles.

Another form of the invention relates to a method and apparatus that comprises the primary vehicle housing a multi-frequency a microwave signal generator which transmits an electromagnetic wave into secondary vehicles which house a receiver system tuned to the microwave frequency signal. A coincidence circuit energizes an alarm circuit whenever the detected signal coincides with the original modulation envelope being applied to the low frequency generator.

In yet another embodiment, the transmitter associated with the primary vehicle is passive and configured to be detected by receiver or detector associated with the secondary vehicle (s). Such a system may employ radio frequency identification devices (RFIDs).

The warning system preferably includes a warning device in the secondary vehicle. The warning system may comprise an existing audio system of the vehicle, where the system is configured to generate an audible and/or visible warning.

Further objects, features, and advantages of the present invention over the prior art will become apparent from the detailed description of the drawings which follows, when considered with the attached figures.

DETAILED DESCRIPTION OF THE INVENTION

Figure 1:
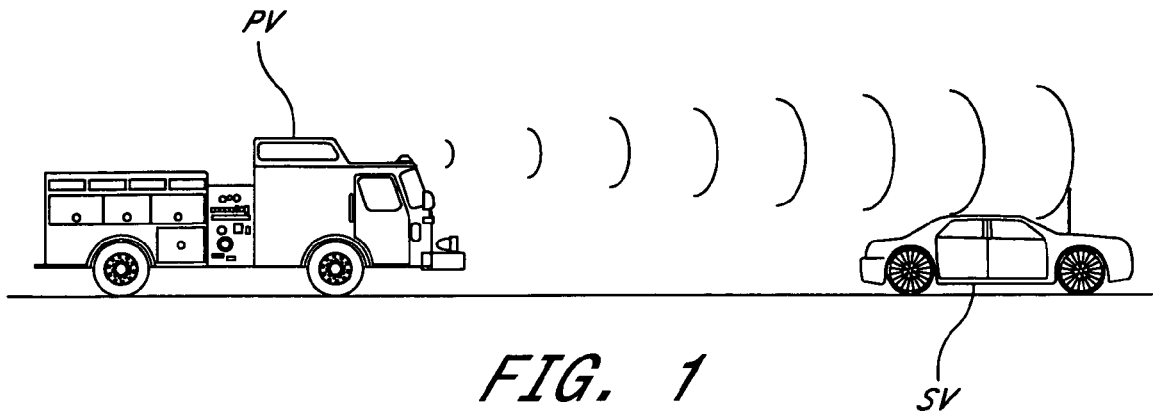
FIG. 1 illustrates an active vehicle to vehicle warning system in accordance with one embodiment of the invention, wherein a primary vehicle includes a transmitter configured to generate and transmit a warning signal for detection by one or more secondary vehicles.

In the following description, numerous specific details are set forth in order to provide a more thorough description of the present invention. It will be apparent, however, to one skilled in the art, that the present invention may be practiced without these specific details. In other instances, well-known features have not been described in detail so as not to obscure the invention.

In general, the invention is a system and method for providing warnings to vehicles. In one embodiment, a primary vehicle includes a transmitter. The transmitter may be passive, such as to be detected by a secondary vehicle. The transmitter may alternatively be active, such as to transmit a wireless signal. Preferably, the system and method allow a secondary vehicle to be provided a warning regarding the presence of a primary vehicle. The invention may also be utilized to provide warnings to secondary vehicles from areas or objects other than primary vehicles. For example, secondary vehicles may be provided with a warning regarding a construction zone or area.

Primary Vehicle with Active Transmitter

In one embodiment, a primary vehicle is configured to transmit a wireless signal to a secondary vehicle. The primary vehicle is preferably equipped with or otherwise includes a signal generator/transmitter. The wireless signal may be of a variety of types, including digital or analog and be at various frequencies.

In one embodiment, a primary vehicle includes a radio transmitter. The radio transmitter can emit signals on a variable basis with respect to distance and frequency. The signal can be independent or dependent on the primary vehicle's speed or distance. The device which emits the signal can be manually or automatically activated.

The frequency of the signal may be, for instance, a Very Low Frequency (VLF). The signal is transmitted from the primary vehicle for receipt by one or more secondary vehicles. In one embodiment, the secondary vehicle includes an appropriate receiver for receiving/detecting the transmitted signal. Preferably, the received signal is utilized to create a warning event.

In one embodiment, a detected VLF signal is modulated to a visual and auditory early warning signal in the secondary vehicle. The VLF signal may be modulated or otherwise utilized to alter the existing electronics, such as the radio, of the secondary vehicle. The Very Low Frequency signal may act as a form of Electromagnetic Interference or EMI.

Electromagnetic Interference or EMI, has been defined as the "degradation of the performance of a piece of equipment, transmission channel, or system caused by an electromagnetic disturbance." (ANSI C63.14, 1992; IEC 60050(161), 1990). EMI can occur throughout the EM spectrum from 0 Hz to 20 GHz or higher frequencies. However, EMI problems are most prevalent in the RF frequencies. For an Electromagnetic Interference or EMI condition to exist, the following conditions must be present:

(1) There must be a source. An interference source is called an "emitter" of electromagnetic energy. The emitter may propagate electromagnetic energy either intentionally, like a hand held radio, or unintentionally, like a power transformer.

(2) There must be a device sometimes referred to as the "victim", that is susceptible to the electromagnetic energy being emitted by the emitter source. If the susceptible device does not have sufficient immunity to reject the energy it is being exposed to, electromagnetic interference may occur.

(3) A physical relationship must exist between the two devices wherein they share a common propagated electromagnetic field. The physical distance between devices and their spatial orientation with respect to each other may have a significant role in determining whether the devices will react with each other.

The sensitivity of a device to EMI is described by either susceptibility or immunity. Since susceptibility to EMI varies with many factors, devices can be placed into an active electromagnetic field without user awareness that a potential EMI problem may exist. Adjacent devices may also unintentionally radiate electromagnetic fields that can, in turn, affect other devices.

The frequency, for instance, can be a Radio Frequency Interference Signal. The signal may be transmitted to the receiver in the secondary vehicle. The VLF signal is then modulated to a visual and auditory early warning signal in the secondary vehicle. The VLF signal is then modulated to alter the existing electronics, including the radio, of the secondary vehicle.

Radio frequency interference (RFI) is electromagnetic radiation which is emitted by electrical circuits carrying rapidly changing signals, as a by-product of their normal operation, and which causes unwanted signals (interference or noise) to be induced in other circuits. This interrupts, obstructs, or otherwise degrades or limits the effective performance of those other circuits. It can be induced intentionally, as in some forms of electronic warfare, or unintentionally, as a result of spurious emissions and responses, intermodulation products, and the like. It is also known as electromagnetic interference or EMI. RFI frequently affects the reception of AM radio in urban areas. It can also affect FM radio and television reception, although to a lesser extent.

The most important means of reducing RFI are: use of bypass or "decoupling" capacitors on each active device (connected across the power supply, as close to the device as possible), risetime control of high speed signals using series resistors and VCC filtering. Shielding is usually a last resort after other techniques have failed because of the added expense of RF gaskets and the like.

The efficiency of the radiation is dependent on the height above the ground or power plane (at RF one is as good as the other) and the length of the conductor in relationship to the wavelength of the signal component (fundamental, harmonic or transient (overshoot, undershoot or ringing)). At lower frequencies, such as 133 MHz, radiation is almost exclusively via I/O cables; RF noise gets onto the power planes and is coupled to the line drivers via the VCC and ground pins. The RF is then coupled to the cable through the line driver as common node noise. Since the noise is common mode, shielding has very little effect, even with differential pairs. The RF energy is capacitively coupled from the signal pair to the shield and the shield itself does the radiating. One cure for this is to use a braid-breaker to reduce the common mode signal.

At higher frequencies, usually above 500 MHz, traces get electrically longer and higher above the plane. Two techniques are used at these frequencies: wave shaping with series resistors and embedding the traces between the two planes.

Referring to FIG. 1, the one or more secondary vehicles SV include a detector configured to detect the signal emitted by the transmitter of the primary vehicle PV. The detector may comprise a receiver, such as a radio frequency receiver configured to receive radio frequency signals.

In one embodiment, the transmitter is associated with the primary vehicle, such as being housed within or otherwise mounted to the primary vehicle. The transmitter may be powered by one or more power sources, such as an electrical system of the vehicle, a battery or the like. Similarly, the detector is associated with the secondary vehicle, such as being housed within or otherwise mounted to the secondary vehicle. As with the transmitter of the primary vehicle, the detector may be powered by various power sources, such as the electrical system of the secondary vehicle or a battery.

As detailed below, the system preferably includes one or more warning devices for the secondary vehicle. The warning devices may be integral with the detector of the secondary vehicle, or comprise other elements, such as an existing audio and/or video system of the secondary vehicle. In one embodiment, in the event the detector detects a signal from the transmitter, a warning is provided at the secondary vehicle. This may comprise the detector generating a signal which is output to the warning device, such as a signal which causes an audible or visible warning to be displayed at the secondary vehicle.

Primary Vehicle with Passive Transmitter

Figure 2:
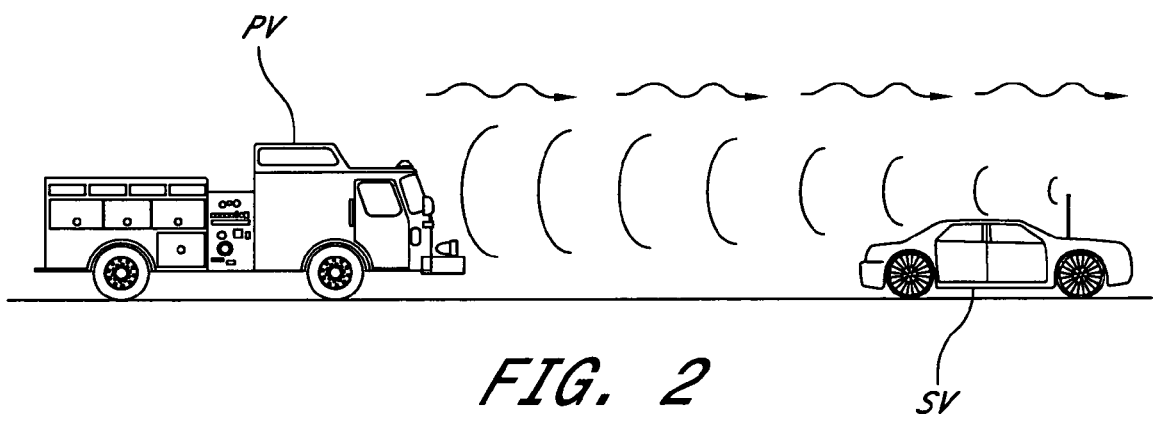
FIG. 2 illustrates a passive vehicle to vehicle warning system in accordance with one embodiment of the invention, wherein a primary vehicle which includes a passive transmitter which is detected by a detector of a secondary vehicle.

In another embodiment, as illustrated in FIG. 2, the primary vehicle PV may be provided with a passive transmitter. In such a configuration, the secondary vehicle SV may be configured to detect the presence of the passive transmitter, such as by itself transmitting a signal.

In one embodiment, the primary vehicle may be configured with an electronic tag, while the secondary vehicle may be configured with a transmitter or receiver configured to detect the presence, in a controlled space or area, of that tag (and thus primary vehicle). For example, the system may include a radio frequency identifier, or other passively detectable element such as a miniature, passive electric signal receptor-reradiator configured to provide a warning of the presence of a primary vehicle to a secondary vehicle.

The tag, such as radio frequency identifier, may be configured to be detected by a detector associated with the secondary vehicle.

In accordance with one aspect of the present invention there is provided a method of detecting, within a confined space, an electric signal receptor-reradiator which has signal-mixing capability. The method may comprise the steps of simultaneously establishing in the controlled space first and second energy fields. The first energy field is chosen to be electromagnetic in nature and is produced by a continuous microwave signal for causing the receptor-reradiator to return a signal there from. The second field is chosen to be electrostatic in nature established by applying signal voltage to a discontinuous conductor relative to a point of reference potential and having a sufficiently low frequency to enable it to be confined substantially to the controlled space. Detection in the space of a signal consisting of a carrier and modulation components where the components are due respectively to said first and second fields is indicative of the presence of the receptor-reradiator therein.

In accordance with another aspect of the present invention, there is provided a vehicle to vehicle warning system for detecting the presence in a controlled space of a receptor-reradiator, said system comprising in combination a source of continuous microwave signals, means coupled to the source of microwave signals for propagating through said space an electromagnetic wave corresponding to the microwave signals, a source of low frequency signals, a discontinuous conductor coupled to the source of low frequency signals for establishing through the space an electrostatic field corresponding to the low frequency signals, signal detecting means, means for coupling the detecting means with the space for receiving signals there from the detecting means being constructed and arranged to detect the low frequency signals only when received as modulation on a carrier signal whose frequency bears a predetermined relationship to that of the microwave signals, and means coupled to the detecting means for providing an alarm responsive to the detection of the low frequency signals.

Once again, in this embodiment, the passive transmitter is preferably associated with the primary vehicle, such as by being mounted to or associated with the primary vehicle. The detector of the secondary vehicle is similarly associated. Further, this embodiment system preferably also again includes at least one warning device for providing a warning at the secondary vehicle.

As one example of this embodiment of the invention, a passenger vehicle may have an active transmitter associated therewith. This transmitter may send a first signal which may be received by a receiver of a primary vehicle (such as an emergency vehicle). In one embodiment, the active transmitter may send a variety of signals and/or information. This information may, but need not be, encoded (such as encrypted). For example, each secondary vehicle, such as passenger vehicle, may transmit a vehicle identification number (VIN), vehicle registration number/license plate, randomly generated number or the like. The primary vehicle receiver is configured to receive (if the signal is in range) and, if necessary, decode that signal.

The primary vehicle may also be configured with a transmitter which is configured to respond to the receipt of the signal from the secondary vehicle with a responsive or second signal, as illustrated in FIG. 2. Such a responsive signal is transmitted from the primary vehicle back to the secondary vehicle (with or without encoding/encryption) for reception at the secondary vehicle. Once again, this return signal may be a variety of signals and/or information. For example, the information may be encoded, and may be configured to be received only by the original source (i.e. the vehicle having the VIN or other identifier which transmitted the original active signal). For example, the secondary vehicle receiver may be configured to decode only signals received from a primary vehicle which match the vehicle's VIN or other identifier.

In one embodiment, this concept may be applied to other types of environments. For example, a passive receiver/transmitter may be located at a primary location other than a vehicle, such as store, building or the like. In such a configuration, a vehicle traveling in the area sends out an active signal which is received at the secondary location, such as a store. In response, the transmitter at the store may be configured to transmit a responsive or second signal back to the vehicle. This signal might be an advertisement or the like. For example, vehicle traveling on the freeway might send a signal which is detected by a local gas station or other merchant of goods or services, and the gas station may send a signal back that causes information to be provided at the vehicle (such as via a display, GPS or audio system at the vehicle) of the location of the gas station, gas prices or the like. In such a configuration, the system may primarily act as a system for providing information to a vehicle in proximity to a particular location.

Of course, a wide variety of information might be transmitted back to the secondary vehicle upon receipt of the signal therefrom. This information might comprise a warning of an emergency vehicle, other warnings such as weather warning or road closures, commercial advertising and the like.

In one embodiment, the signal which is transmitted back to the secondary vehicle from the passive receiver/transmitter might be utilized by the secondary vehicle to provide other than warnings. For example, upon receipt of the signal from a secondary vehicle, a police officer in a nearby car might cause a signal to be transmitted back to the vehicle which causes the vehicle engine to be shut off (such as in the case of a fleeing suspect). In this regard, the receiver at the secondary vehicle may be integrated into or otherwise control various aspects of the vehicle's control system, including a controller C of the vehicle as detailed below.

In one embodiment, one or more safeguard or security features may be employed to ensure that the system is operable relative to a particular secondary vehicle. For example, the secondary vehicle may be equipped with a relay, sensor or other means for detecting the operation of the transmitter/receiver associated therewith. If the transmitter/receiver is detected as not being operable or not operating correctly, a warning may be provided to the operator of the secondary vehicle or the secondary vehicle may be disabled. A warning might comprise a visual or audio alert. Disablement of the vehicle might be accomplished through an ignition circuit, computer engine control or the like. Similarly, means may also be provided for ensuring that signals are being transmitted and received properly, and for providing an alert or disabling the vehicle if such a condition is not confirmed. For example, the transmitter/receiver may be configured to send a test or link signal (at start up or periodically) to the passive receiver/transmitter of the primary vehicle (or even network response devices positioned in various locations), which sends a response. If a response it not confirmed, such as in the case signals are being jammed, the transmitter/receiver of the secondary vehicle may again be configured to provide an alarm or disable the secondary vehicle. Such features may be utilized to prevent a vehicle owner from disabling their transmitter/receiver or jamming the signal transmitted from their vehicle to prevent its operation.

In one embodiment, the active transmitter at the secondary vehicle may always be active (such as configured by the manufacturer). In other embodiments, the operator might turn the system, or features thereof, on or off. For example, the operator of the secondary vehicle might not wish to obtain advertising from local businesses as they drive by, so they might turn off the transmitter or at least that feature. As detailed below, these features may be configured via software and/or hardware, and appropriate user interfaces and inputs (such as user input buttons or touch screens), may be provided for implementing the features.

Various aspects of the invention will now be appreciated.

One aspect of the invention is a vehicle equipped with a signal producing transmitter, such as a radio-frequency transmitter employing one or more oscillators to generate a radio-frequency signal. The invention may also comprise a device housed in a primary vehicle to modulate imprinting data, intelligence, onto an electric current or electromagnetic wave by varying amplitude, frequency, or phase of the wave (carrier) to effect emission. The transmitter may also be configured to transmit a digital signal, including such a signal encoded with information.

In one embodiment, a secondary vehicle includes at least one device, such as a receiver. In one embodiment, the receiver may simply be configured to detect the presence of a signal emitted by the transmitter of the primary vehicle, or receive and/or convert such a signal, such as by converting EM waves into the original signals sent from a distant transmitter. The device may comprise a crystal set acting as a demodulator to recover the modulating waveform from the signal, a direct-conversion receiver which mixes incoming signals with the output of a variable-frequency local oscillator, or a superheterodyne receiver to obtain an output signal that is always at the same frequency, or within a fixed, narrow range of frequencies.

The secondary vehicle receiver or other device may be configured to modify sensitivity to produce a certain signal-to-noise ratio (S/N) or signal-plus-noise-to-noise ratio (S+N/N), to modify selectivity to determine the receivers passband, or range of signal frequencies that is allowed through the system at any given time, to control the receivers dynamic range, a measure of the extent to which a receiver can maintain a fairly constant output, as well as, keep or eliminate signals from weak to strong, and/or to control noise figure, a measure of the amount of noise a radio generates inside its own circuits.

The device may also comprise an RF amplifier, or front end, that includes selective filters between an amplifier and an antenna, which determine the dynamic range and sensitivity of the receiver, which converts the variable signal frequency to a constant IF, or provide IF stages, where selectivity can be obtained utilizing filters, including digital signal processing, to achieve the desired bandwidths and responses.

The device may include a detector which extracts information or intelligence from the signal. The signal may be amplified suitable to listening with a speaker or viewing by a display.

The device may include a processor, computer readable code (software) and other appropriate hardware, such as data storage or memory devices (such as RAM). A shift register may be implemented in software in the microprocessor, said microprocessor software reads in each bit, shifts said bits to bytes, and stores the bytes in RAM.

As indicated above, the method and system of the invention may be implemented in a variety of configurations.

In one embodiment, the invention is a method and apparatus for a vehicle to vehicle warning system within a confined area to detect the presence in the area or space of an electric signal receptor-reradiator with signal mixing capability, the method comprising the steps of simultaneously establishing in the space first and second energy fields, the first field being electromagnetic in nature and produced by a continuous microwave signal for causing the receptor-reradiator to return a signal there from, the second field being electrostatic in nature established by applying a signal voltage to a discontinuous conductor relative to a point of reference potential and having a sufficiently low frequency to enable it to be confined substantially to said space, and detecting the presence in the space of a signal consisting of a carrier and modulation components where the components are due respectively to the first and second fields and where the second field may be produced with a frequency modulated signal.

Another embodiment of the invention is a method and apparatus for a vehicle to vehicle warning system within a confined area for detecting the presence of a miniature passive electromagnetic wave receptor-reradiator with signal mixing capability, the system comprising in combination, a source of continuous microwave signals, means coupled to a source of microwave signals for propagating through space an electromagnetic wave corresponding to the microwave signals, a source of low frequency signals, a discontinuous conductor coupled to aid in establishing low frequency signals for establishing through said space an electrostatic field corresponding to said low frequency signals, the low frequency signals having a sufficiently low frequency to enable the electrostatic field to be confined substantially to the area or space, signal detecting means, means for coupling the detecting means with the space for receiving signals there from, the detecting means being constructed and arranged to detect said low frequency signals only when received as modulation on a carrier signal whose frequency bears a predetermined relationship to that of the microwave signals, and means coupled to the detecting means for providing an alarm responsive to detection of the low frequency signals, and where the discontinuous conductor may comprise a plate-like member.

Yet another embodiment of the invention is a method and apparatus for a vehicle to vehicle warning system within a confined area for detecting the presence in a controlled space of a miniature passive diode-dipole electromagnetic wave receptor-reradiator with signal mixing capability, the system comprising, in combination, a source of microwave signals, means coupled to the source of microwave signals for propagating through the space an electromagnetic wave corresponding to the microwave signals, a source of low frequency signals, a discontinuous conductor coupled to the source of low frequency signals for establishing through the space an electrostatic field corresponding to the low frequency signals, the low frequency signals having a sufficiently low frequency to enable the electrostatic field to be confined substantially to the space, signal detecting means, means for coupling the detecting means with the space for receiving signals there from, the detecting means being constructed and arranged to detect the low frequency signals only when received as modulation on a carrier signal having the same frequency as the microwave signals, and means coupled to the detecting means for providing an alarm responsive to detection of the low frequency signals. The means may be coupled to the source of low frequency signals for pulse modulating the latter, where the means for providing an alarm are coupled to the pulse modulating means for providing the alarm only when the detected low frequency signal has a wave envelope coinciding with an output of the pulse modulating means.

In one embodiment, the invention is a method and apparatus for a vehicle to vehicle warning system within a confined area detecting the presence in a controlled space of a miniature passive electromagnetic wave receptor-reradiator with signal mixing capability, the system comprising in combination a source of microwave signals, means coupled to the source of microwave signals for propagating through the space an electromagnetic wave corresponding to the microwave signals, a source of low frequency signals, means coupled to the source of low frequency signals for frequency modulating the latter with a modulating signal, further means coupled to the source of low frequency signals for establishing through the space an electrostatic field corresponding to the low frequency signals, the low frequency signals having a sufficiently low frequency to enable the electrostatic field to be confined substantially to the space, signal detecting means, means for coupling the detecting means with the space for receiving signals there from, the detecting means being constructed and arranged to detect the low frequency signals only when received as modulation on a carrier signal whose frequency bears a predetermined relationship to that of the microwave signals, and means coupled to the detecting means for providing an alarm responsive to detection of the low frequency signals. The means for providing an alarm may be coupled to the frequency modulating means for providing the alarm only when the detected low frequency signals are frequency modulated with a wave envelope having the same shape as the modulating signal, where the frequency modulation of the source of low frequency signals may be characterized by a frequency deviation of the order of 1 KHz.

In another embodiment, the invention is a method and apparatus for a vehicle to vehicle warning system within a confined area for detecting the presence in a controlled space of a miniature passive electromagnetic wave receptor-reradiator with signal mixing capability; the system comprising in combination a source of microwave signals; means coupled to the source of microwave signals for propagating through the space an electromagnetic wave corresponding to the microwave signals; a source of low frequency signals; means coupled to the source of low frequency signals for establishing through the space an electrostatic field corresponding to the low frequency signals; the low frequency signals having a sufficiently low frequency to enable the electrostatic field to be confined substantially to the space; the source of low frequency signals comprising a voltage-controlled multi-vibrator pulse generator, means coupled to an output of the pulse generator for converting a square wave signal to a sinusoidal signal for use in establishing the electrostatic field, and means coupled to the pulse generator for frequency modulating the latter with a modulating signal; signal detecting means; means for coupling the detecting means with the space for receiving signals there from, the detecting means being constructed and arranged to detect the low frequency signals only when received as modulation on a carrier signal whose frequency bears a predetermined relationship to that of the microwave signals; and means coupled to the detecting means for providing an alarm responsive to detection of the low frequency signals.

As indicated above, the components of the system may be powered by an electrical system of the vehicles with which they are associated. In one or more embodiments, the system and/or device of the invention may include a battery operated power supply.

In one embodiment, when the secondary vehicles receive a signal from a primary vehicle or otherwise detects the primary vehicle, a warning is provided. The warning may comprise, for example, the illumination of a light or lights or generation of sounds at the secondary vehicle, so as to provide a warning to the driver and/or passengers. The lights which are illuminated may be one or more of those already normally associated with the vehicle, or the light or light may be special warning lights (such as a special dash-board light). Sounds may be generated using an existing audio system, or by special devices, such as a buzzer or the like.

Figure 3:
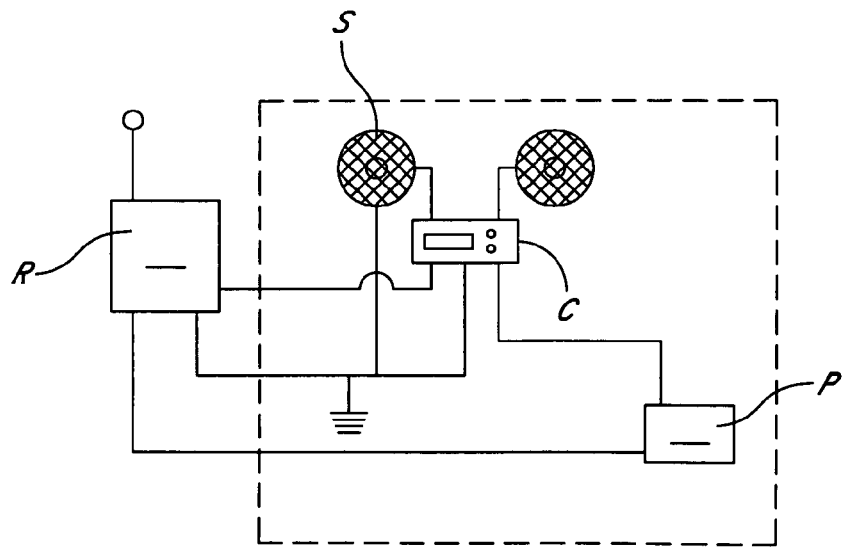
FIG. 3 schematically illustrates secondary vehicle warning system of the invention wherein a receiver is associated with an existing audio system of the secondary vehicle.

FIG. 3 illustrates an embodiment of the invention in which a secondary vehicle includes a receiver R for detecting a primary vehicle. The receiver R also includes an integrated warning signal generator. The receiver R is powered by the power supply P of the vehicle, which includes a ground G. The generated warning signal is provided to a controller C, such as an audio control unit of the vehicle. This signal causes the controller C to output a signal to one or more speakers S of the vehicle, thus providing an audible warning.

It will be appreciated that this configuration is but one example of a warning device for a secondary vehicle. For example, the system could include one or more dedicated audio and/or video devices.

As one implementation of the system and method, primary vehicle may be equipped with a wireless signal generator and transmitter. A secondary vehicle may be equipped with a receiver for receiving the transmitted wireless signal. In response to receipt of the signal, the receiver may be configured to generate and output a warning activation signal or directly generate a warning. For example, the transmitted signal may be received and activate a relay which causes the existing hazard lights of the secondary vehicle to activate (providing both the driver and parties exterior to the secondary vehicle with notice of the warning). Of course, the transmitted signal might be used to initiate a variety of other warnings at the secondary vehicle, whether via existing vehicle circuitry or via other devices.

It will be understood that the above described arrangements of apparatus and the method there from are merely illustrative of applications of the principles of this invention and many other embodiments and modifications may be made without departing from the spirit and scope of the invention as defined in the claims.

What is claimed is:

1. A vehicle control system comprising:
    a transmitter associated with a first vehicle, said transmitter configured to actively transmit, without prompting by a signal from a second vehicle, a first signal comprising information identifying said first vehicle;
    a receiver associated with a second vehicle, said receiver configured to receive said first signal when said first vehicle is within range of said second vehicle;
    a transmitter associated with said second vehicle, said transmitter configured to transmit a vehicle control signal to said first vehicle based upon said first signal; and
    a receiver associated with said first vehicle, said receiver configured to receive said vehicle control signal, said receiver in communication with a vehicle controller of said first vehicle, whereby upon receipt of said vehicle control signal by said receiver, said vehicle controller is caused to change an operating condition of said first vehicle.

2. The vehicle control system in accordance with claim 1 wherein vehicle control signal causes said vehicle controller to shut off an engine of said vehicle.

3. The vehicle control system in accordance with claim 1 wherein said vehicle control signal causes an audible warning to be emitted by an audio system of said vehicle.

4. The vehicle control system in accordance with claim 1 wherein said first signal comprises vehicle identification information, vehicle registration or license plate information.

* * * * *